(12) United States Patent
Johnson et al.

(10) Patent No.: US 6,581,890 B2
(45) Date of Patent: Jun. 24, 2003

(54) ADJUSTABLE STAND FOR HAIR STYLISTS

(76) Inventors: Regina P. Johnson, P.O. Box 8444, Hermitage, TN (US) 37076-8444; Marcus F. Johnson, P.O. Box 8444, Hermitage, TN (US) 37076-8444

(*) Notice: Subject to any disclaimer, the term of this patent is extended or adjusted under 35 U.S.C. 154(b) by 0 days.

(21) Appl. No.: 09/784,731

(22) Filed: Feb. 15, 2001

(65) Prior Publication Data

US 2002/0050546 A1 May 2, 2002

Related U.S. Application Data

(60) Provisional application No. 60/243,607, filed on Oct. 26, 2000.

(51) Int. Cl.[7] .................................................. F16M 11/00
(52) U.S. Cl. ................................... 248/161; 248/176.1
(58) Field of Search .............................. 248/423, 125.8, 248/159, 407, 408, 176.1, 176.2, 121, 161; 211/13.1, 70.6, 85.6, 85.7

(56) References Cited

U.S. PATENT DOCUMENTS

| | | | | |
|---|---|---|---|---|
| 1,310,089 A | * | 7/1919 | Rhodes | 312/206 |
| 2,021,496 A | * | 2/1935 | Anger | 248/117.1 |
| 4,159,773 A | * | 7/1979 | Losenno | 211/70.6 |
| 4,278,223 A | | 7/1981 | Fauteux | 248/125.8 |
| 4,466,203 A | * | 8/1984 | Thomas | 34/99 |
| 4,819,902 A | * | 4/1989 | Wenger et al. | 248/460 |
| 4,973,019 A | * | 11/1990 | Baird et al. | 248/314 |
| 5,064,154 A | | 11/1991 | Payne | 248/121 |
| D327,873 S | | 7/1992 | Luu | D13/139.8 |
| 5,149,282 A | | 9/1992 | Donato et al. | 439/530 |
| 5,423,435 A | * | 6/1995 | Pollard et al. | 211/37 |
| 5,479,953 A | * | 1/1996 | Pasulka | 135/66 |
| 5,490,599 A | | 2/1996 | Tohidi | 211/171 |
| D372,092 S | | 7/1996 | Brown, II | D24/128 |
| 5,613,305 A | * | 3/1997 | Narrin | 34/90 |
| 5,743,415 A | * | 4/1998 | Smart | 211/70.6 |
| 5,765,789 A | | 6/1998 | Ryon et al. | 248/97 |
| 5,917,694 A | * | 6/1999 | Denny | 361/643 |
| 5,924,579 A | * | 7/1999 | DuPont et al. | 211/70.6 |
| 5,992,805 A | | 11/1999 | Tanner | 248/161 |
| 6,135,622 A | * | 10/2000 | Downing | 362/410 |
| 6,158,701 A | * | 12/2000 | Deshler | 248/127 |
| 6,330,948 B1 | * | 12/2001 | Leto | 211/70.6 |
| 6,457,686 B1 | * | 10/2002 | Hill | 248/176.1 |

FOREIGN PATENT DOCUMENTS

JP 05184782 * 7/1993 ................ 211/13.1

* cited by examiner

Primary Examiner—Leslie A. Braun
Assistant Examiner—Deborah M. Brann
(74) Attorney, Agent, or Firm—Waddey & Patterson; Lucian Wayne Beavers

(57) ABSTRACT

A stand for holding hair stylist tools with an adjustable height work table and a power strip on the upper end of the support column. An electrical power supply cord extends from the power strip through the hollow support column.

15 Claims, 3 Drawing Sheets

ADJUSTABLE STAND FOR HAIR STYLISTS

This application claims benefit of co-pending U.S. Provisional Patent Application Ser. No. 60/243,607 filed Oct. 26, 2000, entitled "Adjustable Stand for Hair Stylists."

BACKGROUND OF THE INVENTION

1. Field of the Invention

The present invention relates generally to stands for hair stylists for holding hair stylists' tools such as curling irons and hair dryers and to provide electrical power to those tools.

2. Description of the Prior Art

While performing duties required to style hair, hair stylists must use several electrical tools such as blow dryers, curling irons and clippers. These tools require electrical power which means they must have their electrical cords plugged into a power supply. It would be desirable to have a stand which holds all of the tools required while providing electrical power to all of those tools. It is also desirable that such a stand be of adjustable height, to provide ease of use for different operators, and that the stand be easily disassembled, for transport to different locations.

Although the prior art has included a number of specialized stands for use by hair stylists, none has ever been provided to solve all of the problems mentioned. For example, U.S. Pat. No. 5,064,154 to Payne and U.S. Pat. No. 4,278,223 to Fauteux both disclosed hair stylist stands for holding a single hair dryer.

Therefore, what is needed a specialized support stand for holding several hair stylists tools and providing electrical power to those tools simultaneously, and which is adjustable in height so as to allow use by a variety of hair stylists or to allow use under variable conditions.

SUMMARY OF THE INVENTION

The present invention provides an adjustable stand for hair stylists with a telescoping tubular support column of adjustable height. The column supports a heavy gauge wire work frame, which has several loops and hooks for holding hair stylists' tools. The column also supports a power strip for plugging in the hair stylist tools. An electrical cord extends from the power strip, through the tubular column and out from the base. A plug at the end of the electrical cord may be plugged into a conventional wall outlet. The apparatus is supported by a heavy base member.

It is, therefore, an object of the present invention to provide an improved stand for hair stylists.

Another object of the present invention is to provide a stand for hair stylist being adjustable in height.

And another object of the present invention is the provision of a hair stylist stand having an integrated power supply carried with the stand so that all of the electrical appliances used with the stand may be plugged into the power supply.

And another object of the present invention is the provision of a hair stylist stand having holders for the convenient placement of all of the hair stylist electrically powered tools.

Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is an elevation view showing in frontal view the power supply strip and the various wire loop holders for holding curling irons and the like.

DETAILED DESCRIPTION OF THE INVENTION

Figure 1:
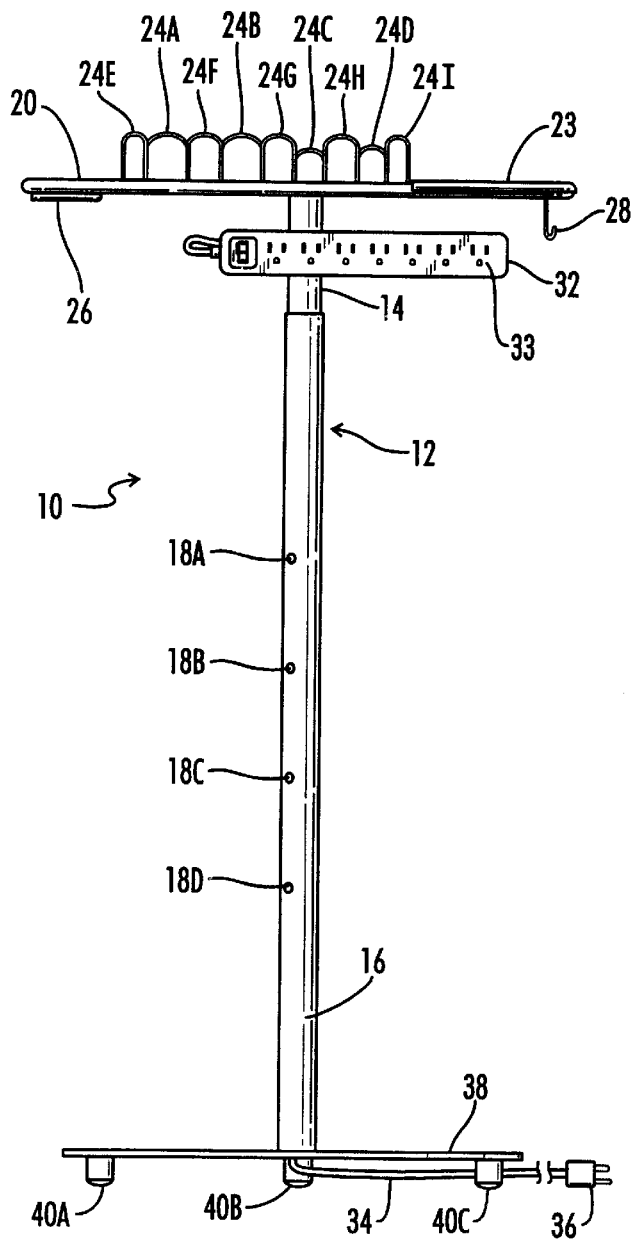
Figure 2:
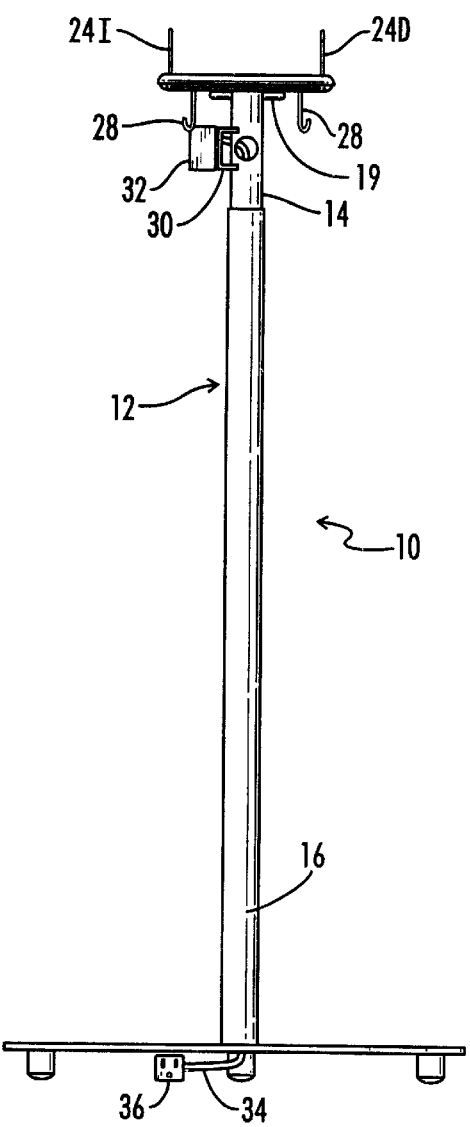
FIG. 2 is a right side elevation view of the apparatus of FIG. 1.
Figure 3:
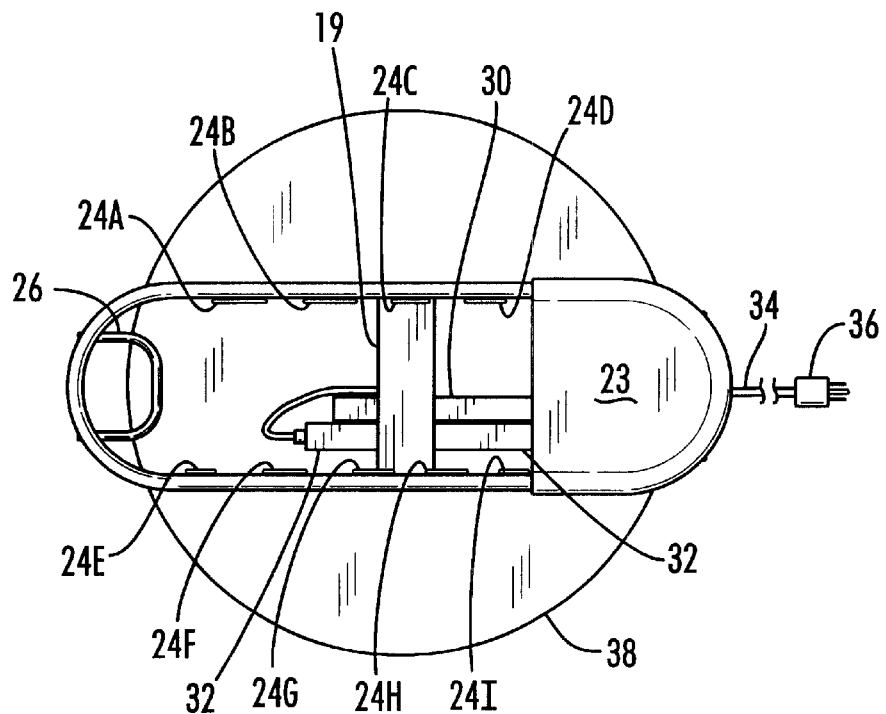
FIG. 3 is a plan view of the apparatus of FIG. 1.

Referring now to the drawings especially FIGS. 1–3, an adjustable stand for hair stylists designated 10 is thereshown. One embodiment of the present invention is a tool support assembly comprising a base 38, an adjustable height column 12, a frame 20 mounted on the top of said column 12 and a power strip 32 mounted on the side of said column 12 adjacent to the frame.

As shown in FIG. 3, said frame 20 is oval in shape. In other embodiments of the present invention, said frame 20 may be square, rectangular or circular in shape.

Figure 4:
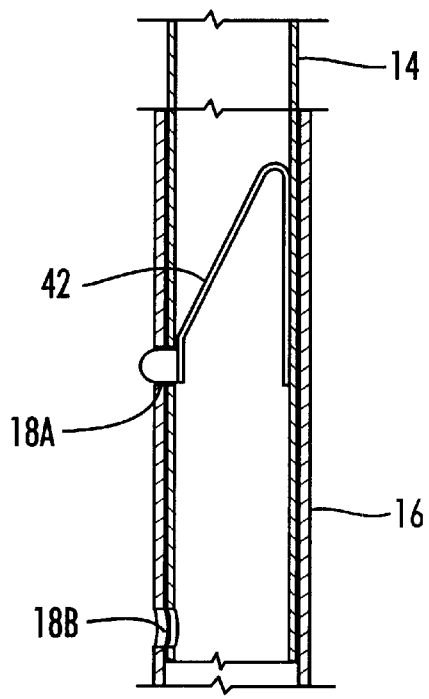
FIG. 4 is a cross section view of the support column of the apparatus of FIG. 1, showing the spring loaded button in the column.

The column 12 further comprises an inner member 14 and an outer member 16, the outer member being telescopingly received over said inner member. In certain embodiments of the present invention said column 12 still further comprises a plurality of incremental position locks. As shown in FIG. 1 and FIG. 4, the incremental position locks comprise a plurality of position holes 18A, 18B, 18C, and 18D on said outer member 16 and a spring loaded button 42 on said inner member. The button 42 protrudes through one of said holes 18 for locking the frame 20 at a selected height.

Figure 5:
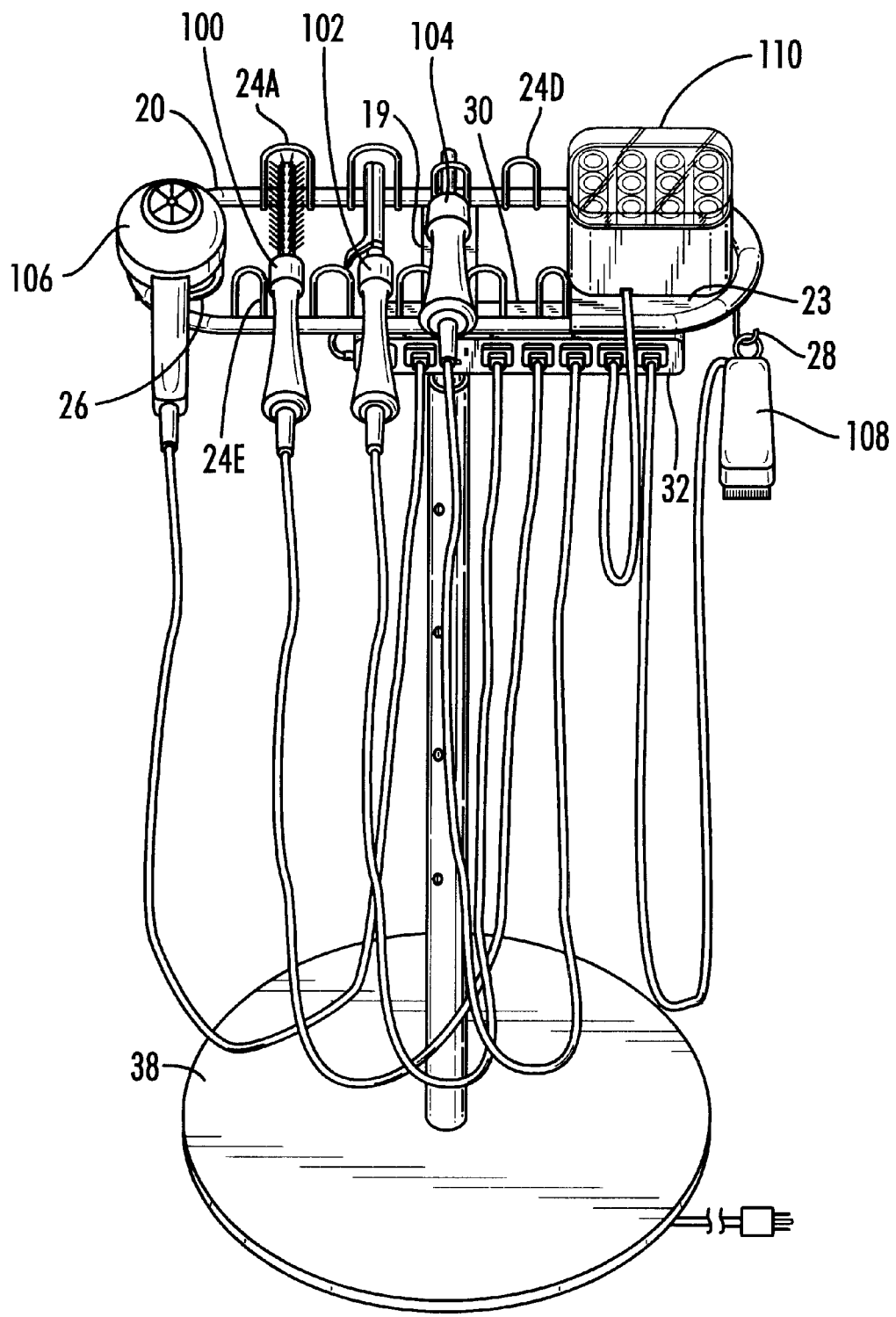
FIG. 5 is a perspective view of the apparatus of FIG. 1 holding hair stylist tools.

Referring to FIG. 3, the frame 20 is a tool holding frame 20 composed of heavy wire, preferably 10 gauge wire and a frame support cross piece 19 that supports the tool holding frame 20. In other embodiments of the present invention, the frame 20 is made of heat-resistant plastic. A plurality of loops 24A, 24B, 24C, 24D, 24E, 24F, 24G, 24H, 24I, and 26, and hooks 28, preferably wire loops and hooks, are attached to said tool holding frame 20. These loops hold hair stylists tools such as curling irons 100, 102 and 104 of different size, a blow dryer 106, and clippers 108 as shown in FIG. 5. Referring to FIG. 3, loop 26 is a large loop in parallel with said tool holding frame 20. Loop 26 can be used for holding the blow dryer 106 as shown in FIG. 5. The loops 24 and 26 are made of a heat resistant material, such as metal or heat-resistant plastic, so that hot hair stylist tools may be held by said frame 20.

In order to hold a hair stylist tool such as a curling irons one places the barrel of the curling iron through loop 24A, 24B, 24C or 24D on the back of said tool holding frame 20 and rests the handle of the curling iron between two loops 24E and 24F, 24F and 24G, 24G and 24H, or 24H and 24I on the front of said tool holding frame 20, as seen in FIG. 5.

The tool holding frame 20 supports a small tray 23, preferably a metal tray, for holding hair stylists tools such as hot rollers. As shown in FIG. 5, tray 23 is supported on the right side of said tool holding frame 20. Tray 23 can be used for holding a variety of hair stylists tools, such as hot rollers 110. Also shown in FIG. 5, hooks 28 are attached to said tool holding frame 20 under said tray 23. Hair stylist tools, such as clippers 108, that can be suspended can be hung from said hooks 28. The present invention also contemplates the opposite arrangement of loop 26, tray 23 and hooks 28, with loop 26 being on the right of tool holding frame 20 and tray 23 and hooks 28 being on the left side of said tool holding frame 20.

All of the electrical hair stylist tools held by said frame 20 can be plugged into said power strip 32 simultaneously, so that all of the tools can be turned on at the same time and can be hot and ready for use. Accordingly, the hair stylist can pick up one of the tools, use it and put it back on said stand, and proceed immediately to using another tool held on the stand. In this way, the hair stylist can use a variety of electrical hair stylist tools without having to change the tools plugged into a single wall outlet and wait for them to warm up prior to use. The ability to maintain a variety of hair stylist tools in a state ready for use and at a convenient location and height will facilitate the ease, efficiency and speed of the hair stylist's work.

In certain embodiments of the present invention, said adjustable height column 12 supports a power strip 32 on the side of said inner member 14 and near said frame 20. As seen in FIG. 1 said power strip 32 is off center. An electrical cord 34 extends from said power strip 32 through said column 12 and out from said base 38. A standard electrical plug 36 is attached to the end of said electrical cord 34. Said electrical plug 36 can be plugged into a standard electrical outlet in order to provide power to the hair stylist tools through said power strip 32. Referring to FIG. 2, said power strip 32 is supported by a cross piece 30 that is attached to said inner member 14 of said column 12. In addition, said power strip 32 has a plurality of electrical outlets 33. Said power cord 34 is connected to said electrical outlets 33.

Referring to FIG. 1 and FIG. 2, said base 38 further comprises legs 40A, 40B, and 40C. One of said legs 40 is adjustable. The length of said adjustable leg may be changed to compensate for uneven flooring, to maintain the balance of said tool support assembly 10. In addition, said base 38 is heavy in order to prevent said tool support assembly 10 from tipping over.

The invention can also be described as comprising a base 38 and a hollow column 12 of adjustable length. Column 12 is attached to said base 38. The frame 20 is mounted on the top of the column 12 and the electrical cord 34 extends through said column 12 and out of the bottom of said column 12. Column 12 further comprises the inner member 14 and the outer member 16 telescopingly received over said inner member. The inner member 14 and outer member 16 further comprise a plurality of incremental position locks 18A, 18B, 18C and 18D. As shown in FIG. 4, said incremental position locks comprise a plurality of position holes 18 in said outer member 16 and a spring loaded button 42 on said inner member 14. The button 42 protrudes through the position hole 18 for adjusting the height of the frame 20. This makes it possible to adjust the height at which the hair stylists tools are held to make the tools convenient for use by the hair stylist.

Several variations of the tool holding frame 20 are contemplated. The tool holding frame 20 could be a solid work table made of an appropriate heat-resistant material, such as metal or glass. Alternatively, said tool holding frame could support an inserted work surface, such as a metal, plastic or glass plane. In addition it could hold a metal tray. In certain embodiments the tool holding frame 20 is heat-resistant plastic.

The present invention further includes a method of holding hair stylist tools which comprises the steps of: providing an adjustable tool support apparatus 10, as seen in FIGS. 1–5, having a frame 20; adjusting the height of the frame 20; attaching hair stylist tools such as blow dryers, curling irons, hot rollers and clippers to the frame 20; and supplying electrical power to the hair stylist tools. The adjusting step further comprises the step of locking said frame 20 at a predetermined incremental height. Electrical power is supplied by passing an electrical cord through a support column 12.

Therefore when in use the hair stylist can adjust the height of the apparatus 10 by telescoping said upper member 14 of said column 12 above said lower member 16. Spring loaded button 42 will lock into one of said position holes 18 to hold said frame 20 at the desired height. As shown in FIG. 5 this can be done while holding all the hair stylist tools and while providing electrical power to these tools simultaneously. Referring to FIG. 5 curling irons can be held by passing the barrel of the curling iron through a loop on the back of the frame 20, such as loop 24A and holding the handle of the curling iron between two loops on the front of the frame 20, such as loops 24E and 24F. Several curling irons can be held at the same time, they can all be plugged into said power strip 32 and they can all be turned on at the same time. In addition a blow dryer can be held by the frame 20. The barrel of the blow dryer is passed through said loop 26 while the handle of the blow dryer rests on said frame 20. The blow dryer can also be plugged in to the power strip 32 at the same time that the curling irons are plugged in. Referring to FIG. 5, a box of hot rollers or other hair stylist tools can be supported on the frame 20 by said metal tray 23. The hot rollers can also be plugged into said power strip 32 at the same time that the blower dryer and the curling irons can be plugged in. Finally, clippers or other hair stylist tools can be suspended from said hooks 28 and plugged into said power strip 32. Apparatus 10 can be moved to a convenient location so that the tools would be in easy reach of the hair stylist depending on the reach of said power cord 34.

Thus, it is seen that the apparatus of the present invention readily meets the ends and advantages mentioned as well as those inherent therein. Numerous changes in the arrangement and construction of parts may be made by those skilled in the art, which changes are encompassed within the scope and the spirit of the present invention as defined by the appended claims. Thus, although there have been described particular embodiments of the present invention of a new and useful Adjustable Stand for Hair Stylists, it is not intended that such references be construed as limitations upon the scope of this invention except as set forth in the following claims.

What is claimed is:

1. A tool support assembly for hair stylists, comprising:
   a base;
   a column of adjustable height having first and second ends, the first end being attached to the base;
   a frame mounted on the second end of the column, the frame including a tool holding frame and a plurality of loops and hooks attached to the tool holding frame for holding hair stylist tools; and
   a power strip mounted on the column adjacent the frame.

2. The apparatus of claim 1, the column further comprising:
   an inner member; and
   an outer member telescopingly received over the inner member.

3. The apparatus of claim 2, the inner member and the outer member further comprising:
   a plurality of incremental position locks.

4. The apparatus of claim 3, the incremental position locks further comprising:
   a plurality of position holes on the outer member of the column; and a spring loaded button on the inner member of the column, the button protrudes through the position holes, for adjusting the height of the frame.

5. The apparatus of claim 1, further comprising:
   an electrical cord extending from the power strip, through the column and having an end extending out from the base; and
   a plug attached to the end of the cord.

6. The apparatus of claim 1, the power strip further comprising:
   a crosspiece, attached to the column;
   a plurality of electrical outlets mounted on the cross piece; and
   a power cord attached to the electrical outlets.

7. The apparatus of claim 6, further comprising:
   an electrical cord extending from the power strip, through the column and having an end extending out from the base; and
   a plug attached to the end of the cord.

8. A tool support assembly for hair stylists, comprising:
   a base;
   a hollow column of adjustable height having first and second ends, the first end being attached to the base;
   a frame mounted on the second end of the column, the frame further including a wire frame, a plurality of wire loops attached to the wire frame, and a plurality of wire hooks attached to the wire frame; and
   an electrical cord extending through the hollow column and having a lower end extending out of the column.

9. The apparatus of claim 8, the column further comprising:
   an inner member; and
   an outer member telescopingly received over the inner member.

10. The apparatus of claim 9, the inner member and the outer member further comprising:
    a plurality of incremental position locks.

11. The apparatus of claim 10, the incremental position locks further comprising:
    a plurality of position holes on the outer member of the column; and
    a spring loaded button on the inner member of the column, the button protrudes through the position holes, for adjusting the height of the frame.

12. The apparatus of claim 8, wherein the wire frame is oval shaped.

13. A tool support assembly for hair stylists, comprising:
    a base;
    a column of adjustable height having first and second ends, the first end being attached to the base;
    a frame mounted on the second end of the column, the frame further including a wire frame, a plurality of wire loops attached to the wire frame, and a plurality of wire hooks attached to the wire frame; and
    a power strip mounted on the column adjacent the frame.

14. The apparatus of claim 13, wherein the wire frame is oval shaped.

15. A tool support assembly for hair stylists, comprising:
    a base;
    a hollow column of adjustable height having first and second ends, the first end being attached to the base;
    a frame mounted on the second end of the column, the frame further including a tool holding frame, and a plurality of loops and hooks attached to the tool holding frame for holding hair stylist tools; and
    an electrical cord extending through the hollow column and having a lower end extending out of the column.

* * * * *